Sept. 27, 1955          F. FASELT          2,718,820
SPINDLE ATTACHMENT FOR MACHINE TOOLS
Filed July 31, 1952          3 Sheets-Sheet 1
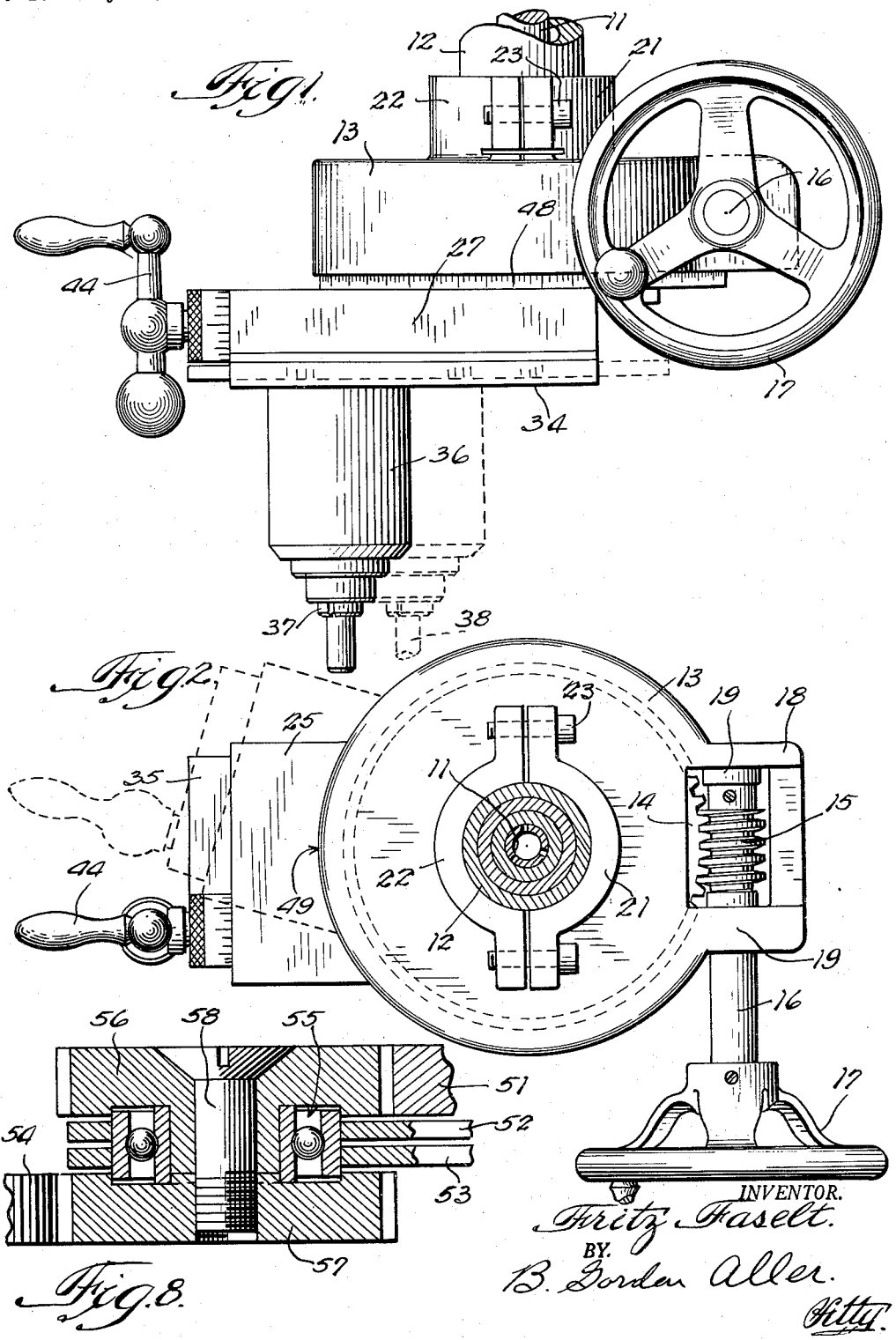

Sept. 27, 1955  F. FASELT  2,718,820
SPINDLE ATTACHMENT FOR MACHINE TOOLS
Filed July 31, 1952  3 Sheets-Sheet 2
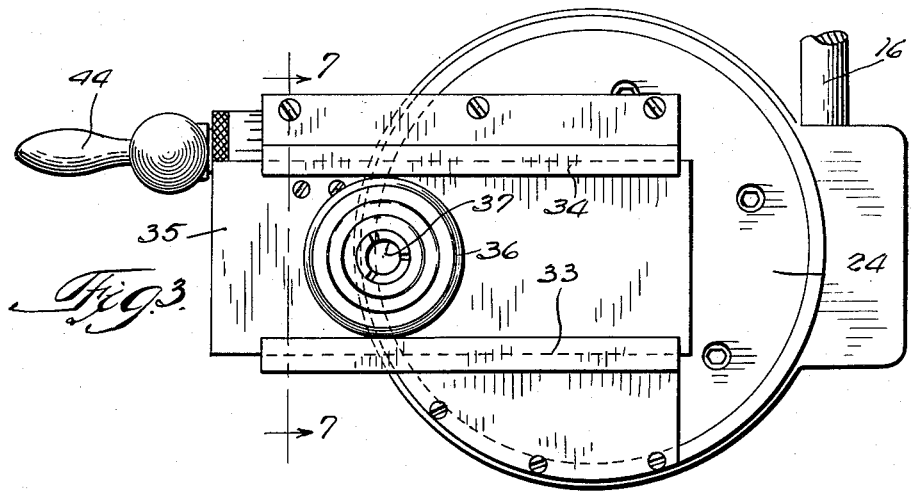
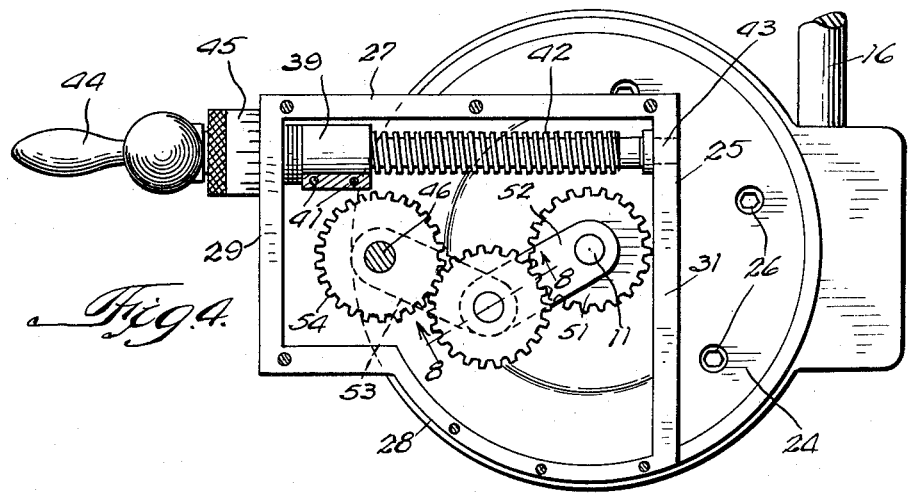
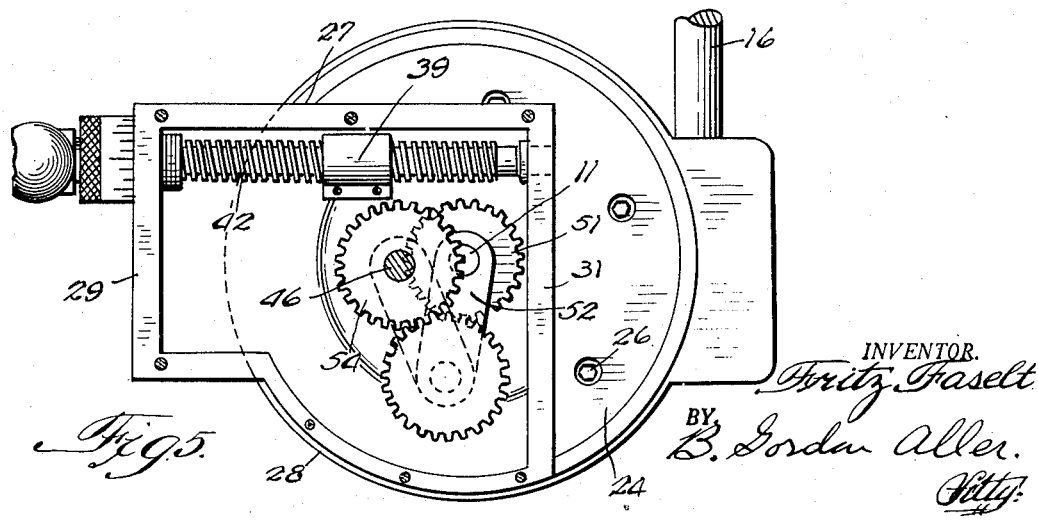
INVENTOR.
Fritz Faselt
BY B. Gordon Allen Sept. 27, 1955 F. FASELT 2,718,820
SPINDLE ATTACHMENT FOR MACHINE TOOLS
Filed July 31, 1952 3 Sheets-Sheet 3
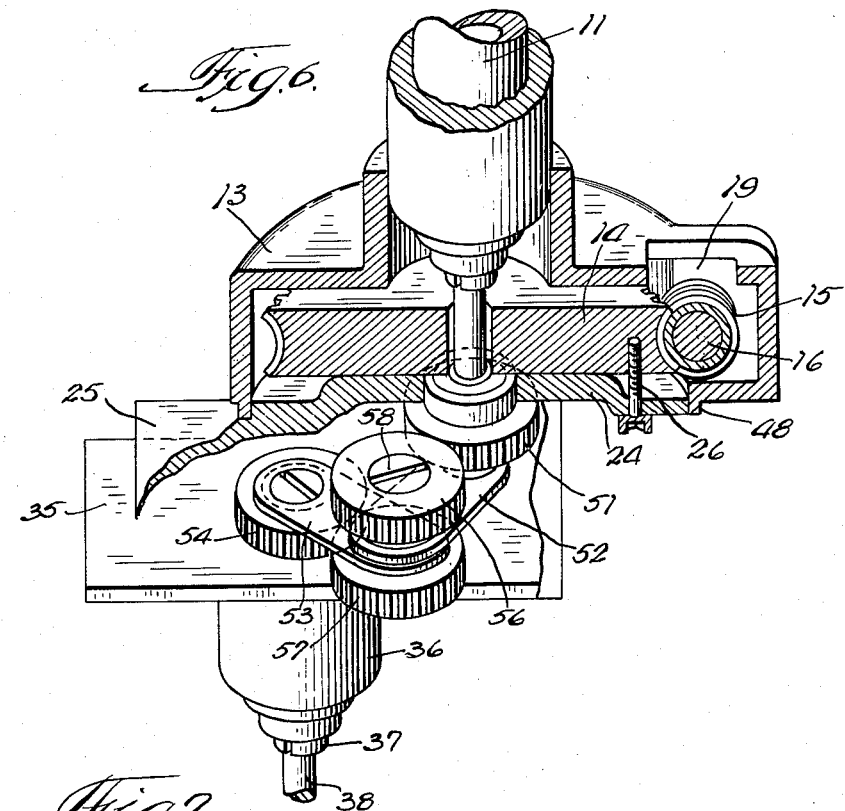
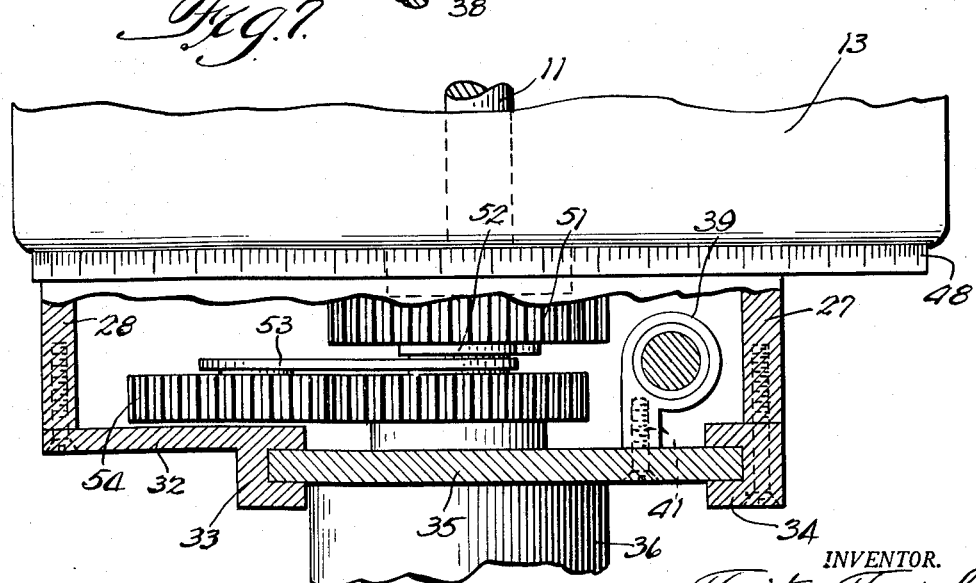
INVENTOR.
Fritz Faselt.
BY
B. Gordon Allen.

United States Patent Office 2,718,820
Patented Sept. 27, 1955

2,718,820

SPINDLE ATTACHMENT FOR MACHINE TOOLS

Fritz Faselt, Chicago, Ill.

Application July 31, 1952, Serial No. 301,938

5 Claims. (Cl. 90—16)

The present invention relates to improvements in milling machines and concerns itself more particularly with the provision of a milling machine attachment which provides a tool holding spindle which may be radially and circumferentially adjusted.

Milling machines of the general class to which this invention pertains have been proposed before, limited by mechanical and geometric characteristics and requiring costly processing for the achievement of versatility and accuracy.

The principal object of the present invention is to produce a milling machine attachment provided with a cross slide gyratory spindle which is universally adaptable to a wide range of rotary spindle machine structures for mounting, which efficiently transmits its driving power from the principal spindle shaft with low factors of transmitting loss, and which is capable of infinite adjustment from coaxial alignment with the principal spindle to whatever maximum range may be accommodated.

Another object of the present invention is to provide an economical-to-produce attachment for vertical spindle milling machines which utilizes an offset and adjustable tributary spindle having infinite degrees of adjustment, and improved convenience and accessibility to an attendant operator.

A still further object of the present invention is to provide a displaceable spindle attachment for rotary power tools which may be radially and circumferentially adjusted while maintaining the power train connection at all times between the principal spindle and the attachment spindle and by providing the various adjustments independent of each other so that the operation of either will not disturb any setting of the other.

Further objects of this invention are such as are inherent in the unique features of the structure and in the principles of its operation as disclosed in the more detailed description following hereinafter and illustrated in the annexed drawings, in both of which corresponding parts are designated by similar reference numerals throughout, and in which:

Fig. 1 is a side elevational view of a milling machine attachment embodying certain features of the present invention shown applied to a conventional spindle and quill of a vertical spindle milling machine.

Fig. 2 is a plan view of the apparatus illustrated in Fig. 1 with the drive sleeve of the principal machine shown in section.

Fig. 3 is an inverted plan view of the apparatus illustrated in Figs. 1 and 2 with the hand wheel of the circumference adjustment shaft broken away.

Fig. 4 is an inverted view similar to Fig. 3 with the cross slide and cover plate removed to reveal posterior mechanism.

Fig. 5 is a view similar to Fig. 4 illustrating a changed position of the apparatus.

Fig. 6 is a diagrammatic perspective view with portions of the housing structure sectioned away for elucidation.

Fig. 7 is a fragmentary view taken approximately on line 7—7 of Fig. 3 on a slightly enlarged scale, and Fig. 8 is a fragmentary sectional view taken approximately on line 8—8 of Fig. 4.

The principal driving spindle in a vertical milling machine has been indicated in Fig. 1 by the reference numeral 11. This member consists of a length of rotatable shafting nicely journaled for the sake of precision and axially adjustable relative to its quill or surrounding tube 12 carried by an overhanging arm of the principal machine and aligned over a work table in which the article worked upon is secured.

The present attachment includes a principal housing member 13 internally hollow and having a generally cylindrical contour, whereby to accommodate an indexing gear wheel 14. In the instant contemplation the periphery of wheel 14 is machined with worm threads to mesh with a driving worm 15 carried by the regulating shaft 16, see particularly Fig. 2, the outer end of which mounts a hand wheel 17.

The shaft 16 is journaled in a bracket formation 18 integral with the housing 13 in which are formed appropriate journal embossments 19. By rotating the hand wheel 17 and through it shaft 16 and worm 15, accurate rotation may be imparted to the gear wheel 14 whereby to position this member axially with respect to the housing 13, which is bolted to the quill as by the clamping cap arrangement 21 and the half-collar 22 by means of cap screws 23.

The under surface of housing member 13 is closed by a circular close fitting disc formation 24 which may be integral with a turret housing or mount generally designated 25. The disc formation 24 is integrated with the gear 14 through a series of strategically placed clamp screws 26, and it too is a hollowed-out enclosure comprised of the side wall sections 27 and 28 and the end wall sections 29 and 31.

As best observed in Figs. 4 and 5, the side and end wall sections will be noted to have substantial perpendicularity one with another, except that wall 28 includes a curved portion to conform with the contour of the principal casing member 13 throughout a portion of its periphery. The housing chamber of the turret or mount 25 is closed by a detachable cover plate generally designated 32 and formed with ways or guide rail elements 33 and 34 for the reception therewithin of a cross slide plate 35.

The cross slide 35 is formed with a downwardly extending cylindrical embossment 36 bored to receive and journal therewithin a driven spindle supporting a collet 37 in which may be mounted a rotary working tool 38. The cross slide 35 is integrally associated with a follower nut 39 as by bolting or otherwise at 41. Nut 39 is internally threaded and rides on a threaded adjustment shaft 42 which is journaled at its remote end as at 43 in the wall 31 and at its adjacent end in the wall 29. The adjacent end of shaft 42 is customarily provided with a manipulation crank 44 as well as with a dividing head index 45 so that its angular position may at all times be discernable upon the dividing head calibrations relative to an index marking on the outer surface of wall 29.

The driven spindle which is contained in cross slide bushing 36 has been designated in Figs. 4 and 5 by the reference numeral 46. It is supported in cantilever fashion by sturdy end thrust and circumferential bearing elements contained in the bushing 36 so as to withstand the rigors and stresses to which it may become subjected as a result of various work strains.

The radial movement of slide 35 is susceptible of precise calibration so that by providing markings between its surface and one or the other of the guide flanges 33 and 34 as well as by the dividing head marks on its collar 45, the location of the work spindle 36 may at all times be calculated. Also, the angular position of the turret housing may be readily discerned by providing longitudinal calibrations on the flange projection 48 which extends down from the casing member 13 and which surrounds the disc 24 relative to an index marking such as that designated 49 in Fig. 2 on the top surface of the turret housing 25.

The ways 33 and 34 which are formed integral with the cover 32 of mount 25 are shown to be simple rectangular guides, although it is to be understood that consistent with usual practice these guide elements may be constructed as V-grooves or in any other fashion as may be preferred. By rotating the crank handle 44 and turning the threaded shaft 42, the follower nut 39 may be disposed variously along the length of the threaded portion of shaft 42 within a range of adjustment starting from concentricity between the tool shaft 46 and the stationary driven shaft 11 until the offset displacement between these two shafts entails the full span afforded by the linkage now to be described.

It has been stated that cross slide 35 carries the bearing sleeve or collar 36 of the work spindle and that within the collar 36 abundantly secured against wear and strain is the short length of shaft terminating in a collet 37 and holding various types of rotary tools, for example, 38. By executing the just described adjustment involving shaft 42, the tool or driven shaft 46, together with its collet 37, is adjustable relative to its distance from driving shaft 11 radially. By rotating hand wheel 17 and its shaft 16 which carries worm gear 15 meshing with the indexing worm wheel 14, the entire slide mount 24 may be rotated circumferentially about the axis of shaft 11 as a center. The radial adjustment as suggested by dotted out line in Fig. 1 and the circumferential adjustment as suggested by the dotted out line in Fig. 2 including all variations of these adjustments within the range of limits inherent in the design may be made while the stationary spindle is imparting rotation to the roving axis tool holding spindle 46 in the following manner.

At the lower end of stationary shaft 11 there is secured a driving gear 51 which may be of relatively narrow width, but which is disposed well within the chamber and clearance afforded by the housing aperture of mount 25. Preferably, a short length of the shaft 11 should protrude beyond the lowermost limit of gear 51 to serve the purpose of centering and locating the end of a bracket link 52. In order to make certain that the end of link 52 may be retained on the end of shaft 11, the hole in link 52 through which the shaft 11 is thus directed may be marginally countersunk and the end of the shaft swaged over or otherwise restrained.

Link 52 is the upper one of a pair of identical members which are foldable, one over the other, after the manner best indicated in Figs. 4 and 5, and its companion 53 is secured to the tool holding shaft 46 in the same manner or in any other suitable fashion which will permit these two links to maintain the action relative to each other which is thus required. Secured to the upper end of shaft 46 in correspondence with driving gear 51 is a driven gear 54 which may be of identical size and shape to driving gear 51.

The two links 52 and 53 are mutually pivoted around a ball race journal designated 55 (Fig. 8) so that their relationship to each other is not disturbed during the transmission of rotary power from driving gear 51, through the uppermost intermediate gear 56, its integrally associated lower intermediate gear 57, to the driven gear 54. Intermediate gears 56 and 57 are coupled together as by a transversely extending tie bolt 58, or in any other suitable manner, so that they will operate like a single piece part although one of them, namely, 56 lies in planar alignment with driving gear 53, while the other one 57, lies in planar alignment with driven gear 54 throughout all courses of adjustment in which they may be involved.

Changes may be made in form and substance without departing from the spirit of the invention or sacrificing any of the advantages and the right is hereby reserved to make all changes which fairly fall within the scope of the following claims.

What is claimed as new and desired to be secured by Letters Patent of the United States is as follows:

1. An adjustable offset spindle attachment for milling machines comprising a casing adapted to be secured around a principal spindle, an indexing gear contained within said casing in coaxial alignment with the principal spindle, said gear being provided with worm threads at its periphery, an adjustment worm journaled in said casing and meshing with said worm threads, a turret housing closing the bottom of said casing member and secured to said indexing gear for rotation therewith relative to said casing, said casing having an opening communicating with said turret housing, a cross slide in said turret housing carrying a tool spindle, and a gear train for transmitting rotary power from said principal spindle to said tool spindle which comprises a driving gear carried by said principal spindle in axial alignment with said indexing gear, said driving gear having a shaft extending through said turret housing for connection to a chuck, a driven gear carried by and in axial alignment with said tool spindle, a pair of integrally associated intermediate gears of which one is in planar alignment with said driving gear and the other in planar alignment with said driven gear, a pair of arms having a common end pivoted coaxial with said intermediate gears, the remote end of one of said arms being associated with said driving gear spindle and the remote end of the other of said arms being associated with said driven gear spindle and releasable means on top of said casing for attaching said attachment to the spindle jacket of a milling machine.

2. The combination set forth in claim 1 in which said casing carries an adjusting shaft tangentially disposed and meshing with said indexing gear for manual rotation to produce gyration of said turret housing and its tool spindle relative to said principal spindle.

3. In a milling machine attachment which may be applied as a unit to a vertical spindle jacket of a milling machine having a vertical spindle rotatable in said jacket and carrying a tool chuck below said jacket, the combination of a casing member, means on top of said member for detachably fixing said member to said jacket, a turret housing closing the bottom of said casing member and rotatable relative thereto, a worm wheel in said casing member, said wheel being fixed to said housing and having a central opening concentric with said means, a worm rotatably mounted in said casing member and meshed with said wheel, a driving gear in said housing having a shaft extending through said opening for engagement with said chuck, a slide in said turret housing carrying a driven spindle, a driven gear keyed to said spindle, a pair of upper and lower coaxial gears, the upper gear being entirely above the level of said driven gear and being meshed with said driving gear, the lower gear being entirely below the level of said driving gear and being meshed with said driven gear, journal means between said upper and lower gears and connected thereto approximately coaxial therewith, links having corresponding ends thereof journalled on said journal means, the opposite corresponding ends of said links being pivotally associated with said driving and driven gears, respectively, and screw means connected to said housing and slide, respectively, for adjusting said driven spindle radially with respect to the axis of said shaft.

4. In a milling machine attachment which may be applied as a unit to a vertical spindle jacket of a milling machine having a vertical spindle rotatable in said jacket and carrying a tool chuck below said jacket, the combination of a casing member, a turret housing closing the bottom of said casing member, said housing being rotatable relative to said casing member and being provided with an opening communicating with the interior of said casing member, a worm wheel in said casing member fixed to said housing, a worm rotatably mounted in said housing and meshed with the wheel for adjustably rotating said housing, said wheel having an opening aligned with the first-mentioned opening, a slide guidably supported by said housing for linear movement relative thereto, said slide carrying a driven spindle, means for so moving the slide to adjust said driven spindle radially with respect to the first-mentioned spindle, a driving gear having a shaft extending through said openings for connection to said chuck, an extensible gear train connecting said driving gear to said driven spindle to accommodate said radial adjustment thereof, and releasable means on top of said casing member coaxial with said worm wheel for attaching said housing member to said jacket.

5. In a milling machine attachment which may be applied as a unit to a vertical spindle jacket of a milling machine having a vertical spindle rotatable in said jacket and carrying a tool chuck below said jacket, the combination of a housing member having means on top thereof for releasably clamping said jacket, a worm wheel in said housing member substantially coaxial with said clamping means, said wheel having a central opening, a worm rotatably mounted in said housing member and meshed with said wheel for adjustably rotating the latter, a turret housing beneath said member and fixed to said worm wheel, a slide mounted on said housing and carrying a depending driven spindle, a driving gear in said housing having a shaft extending through said opening and connected to said chuck, screw means carried by the housing and connected to the slide for adjustment thereof radially of said first-mentioned spindle, and an extensible gear train connecting said gear to said driven spindle.

References Cited in the file of this patent
UNITED STATES PATENTS

| | | |
|---|---|---|
| 1,132,534 | De Leeuw | Mar. 16, 1915 |
| 1,913,781 | Wiley et al. | June 13, 1933 |
| 2,069,299 | Bartholomew | Feb. 2, 1937 |